(12) United States Patent
Honda et al.

(10) Patent No.: US 9,111,355 B1
(45) Date of Patent: Aug. 18, 2015

(54) SELECTIVE COLOR PROCESSING FOR VISION SYSTEMS THAT ENABLES OPTIMAL DETECTION AND RECOGNITION

(71) Applicant: HRL Laboratories, LLC, Malibu, CA (US)

(72) Inventors: Alexander L Honda, Sunnyvale, CA (US); Yang Chen, Westlake Village, CA (US); Shinko Y. Cheng, Cupertino, CA (US); Deepak Khosla, Camarillo, CA (US); Kyungnam Kim, Oak Park, CA (US); Changsoo S. Jeong, Rancho Palos, CA (US); Lei Zhang, Torrance, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/205,327

(22) Filed: Mar. 11, 2014

Related U.S. Application Data

(60) Provisional application No. 61/779,143, filed on Mar. 13, 2013, provisional application No. 61/779,179, filed on Mar. 13, 2013.

(51) Int. Cl.
*G06K 9/00* (2006.01)
*G06T 5/00* (2006.01)
*G06T 5/40* (2006.01)

(52) U.S. Cl.
CPC .. *G06T 5/008* (2013.01); *G06T 5/40* (2013.01)

(58) Field of Classification Search
None
See application file for complete search history.

(56) References Cited

U.S. PATENT DOCUMENTS

| 8,478,029 B2 * | 7/2013 | Tolliver et al. | 382/162 |
| 8,755,597 B1 * | 6/2014 | Tantalo et al. | 382/162 |
| 2009/0169102 A1 * | 7/2009 | Zhang et al. | 382/167 |

OTHER PUBLICATIONS

Yuv, Lab, and YCrCb color spaces, which are described in Digital Image Processing Using Matlab, 2nd Ed., Chapter 6, 2009 by Gonzalez, Woods and Eddins.

* cited by examiner

*Primary Examiner* — Phuoc Tran
(74) *Attorney, Agent, or Firm* — Tope-McKay & Associates

(57) ABSTRACT

Described is a system for selective color processing for vision systems. The system receives a multi-band image as input. As an optional step, the multi-band image is preprocessed, and a transformation is performed to transform the multi-band image into a color space. A metric function is applied to the transformed image to generate a distance map comprising intensities which vary based on a similarity between an intensity of a pixel color and an intensity of a target color. A contrast enhancement process is applied to the distance map to normalize the distance map to a range of values. The range of values is expanded near the intensity of the target color. Finally, an output response map for the target color of interest is generated, such that the output response map has high responses in regions which are similar to the target color to aid in detection and recognition processes.

24 Claims, 9 Drawing Sheets
(2 of 9 Drawing Sheet(s) Filed in Color)

SELECTIVE COLOR PROCESSING FOR VISION SYSTEMS THAT ENABLES OPTIMAL DETECTION AND RECOGNITION

GOVERNMENT LICENSE RIGHTS

This invention was made with government support under U.S. Government Contract Number HR0011-10-C-0033 Neovision2. The government has certain rights in the invention.

CROSS-REFERENCE TO RELATED APPLICATIONS

This is a Non-Provisional patent application of U.S. Provisional Application No. 61/779,143, filed in the United States on Mar. 13, 2013, entitled, "Selective Color Preprocessing for Vision Systems that Enables Optimal Detection and Recognition." This is also a Non-Provisional patent application of U.S. Provisional Application No. 61/779,179, filed in the United States on Mar. 13, 2013, entitled, "Robust Static and Moving Object Detection System via Multi-Scale Attentional Mechanisms."

BACKGROUND OF THE INVENTION (1) Field of Invention

The present invention relates to a system for selective color processing and, more particularly, to a system for processing multi-band images around a targeted color of interest.

(2) Description of Related Art

Image processing is a form of signal processing for which the input is an image, and the output is either an image, or a set of characteristics or parameters related to the image. Contrast enhancement is one form of image processing which seeks to increase contrast in low contrast ranges for object detection and recognition. Histogram equalization tries to match a true image histogram to a target histogram in order to increase contrast in low contrast ranges. Histogram equalization relies on image statistics to generate histograms, which in video sequences can suffer from frame to frame histogram fluctuations. These discrepancies can be caused by large objects entering or leaving the view, or from non-linear illumination changes.

Independent component analysis (ICA) is a computational method for separating a multivariate signal into additive subcomponents by assuming that the subcomponents are non-Gaussian signals and that they are all statistically independent from each other. ICA is a case of blind signal separation, which is the separation of a set of source signals from a set of mixed signals, without the aid of information about the source signals or the mixing process.

A continuing need exists for an image processing method which attempts to separate a color source based on an input parameter, rather than performing it blindly. Additionally, it would be advantageous to have a method that applies contrast enhancement only to a range of intensities of interest while suppressing contrast in other regions, as opposed to standard histogram equalization which attempts to linearize the image histogram.

SUMMARY OF THE INVENTION

The present invention relates to a system for selective color processing and, more particularly, to a system for processing multi-band images around a targeted color of interest. The system comprises one or more processors and a memory having instructions such that when the instructions are executed, the one or more processors perform multiple operations. The system receives a multi-band image as input. A metric function is applied to the multi-band image to generate a distance map. The distance map comprises a plurality of intensities which vary based on a similarity between an intensity of a pixel color and an intensity of a target color of interest. A contrast enhancement process is applied to the distance map to normalize the distance map to a range of values. The range of values of the distance map is expanded near the intensity of the target color of interest. Finally, an output response map having value ranges for the target color of interest is generated to aid in detection and recognition processes. The output response map comprises a plurality of regions, and the output response map has high responses in regions which are similar to the target color of interest.

In another aspect, a scalar distance in the color space between each pixel color in the multi-band image and the target color of interest is output.

In another aspect, the range of values is expanded via a tunable sensitivity parameter.

In another aspect, an exponential function is applied to the distance map, such that the intensity of the target color of interest in the multi-band image maps to one, and pixel colors with a larger distance to the target color of interest map closer to zero.

In another aspect, the system compresses value ranges of the output response map for regions of the multi-band image with pixel colors that are non-similar to the target color of interest, and expands the value ranges of the output response map for pixel colors that are similar to the target color of interest.

In another aspect, prior to applying the metric function, the multi-band image is preprocessed and a transformation is performed to transform the multi-band image into a preferred color space, resulting in a transformed image having pixel colors, wherein the output response map has high responses in regions which contain colors similar to the target color of interest in the transformed image.

In another aspect, an exponential function is applied to the distance map, such that the intensity of the target color of interest in the transformed image maps to one, and pixel colors with a larger distance to the target color of interest map closer to zero.

In another aspect, the system compresses value ranges of the output response map for regions of the transformed image with pixel colors that are non-similar to the target color of interest, and expands the value ranges of the output response map for pixel colors that are similar to the target color of interest.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where.

DETAILED DESCRIPTION

Figure 1:
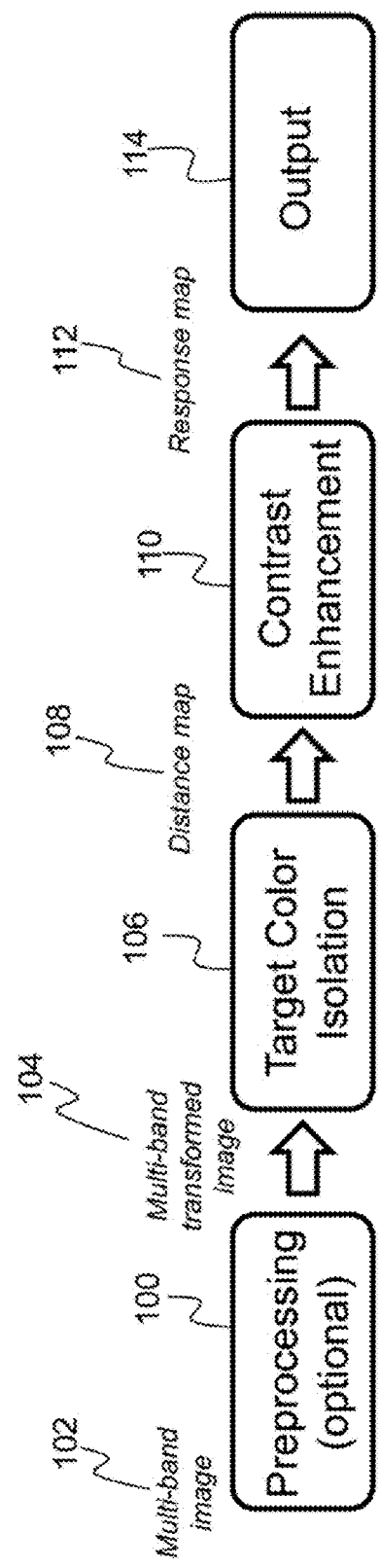
FIG. 1 is a flow diagram illustrating selective color processing for vision systems according to the principles of the present invention.

The present invention relates to a system for selective color processing and, more particularly, to a system for processing multi-band images around a targeted color of interest. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction.

Instead, they are used to reflect relative locations and/or directions between various portions of an object. As such, as the present invention is changed, the above labels may change their orientation.

(1) Principal Aspects

The present invention has three "principal" aspects. The first is a system for selective color processing. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for selective color processing. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(2) Specific Details

When processing multi-band image data, it is often necessary to compress it down to a single band. This may be either for computational reasons or for algorithmic reasons. The present invention is a fast, tunable method for selective color processing for vision systems when source information is given. Unlike traditional methods which do not use knowledge about the scene, the method according to the principles of the present invention operates on a relaxed problem, and requires that a target color be known. Rather than trying to decompose an image into individual sources, the present invention extracts a single source that corresponds with the target color and applies a non-linear transformation to enhance the target color in the resulting image.

A purpose of the present invention is to provide a response map for a target color as a fast processing step in a larger object detection and recognition system. One non-limiting example is a hyper-spectral imaging system which is sensitive to a particular spectral response. The system is also able to expand the range of values near the target color via a tunable sensitivity parameter, which will be described in further detail below.

(2.1) System Overview

Described is a system for processing multi-band images with respect to a targeted color of interest. It performs dimension reduction from an image with an arbitrary number of channels or bands down to a single band image. Via a pixel-wise transformation, the original image is converted into a single band image with a value range of [0, 1]. This transformation results in two desired effects: the target color of interest maps to the maximum attainable value (i.e., the brightest), and the contrast around the target color of interest is enhanced. Unlike conventional techniques, the technique according to the principles of the present invention expands the range of values only of colors similar to the target color, while compressing the range of colors away from it.

The method described herein requires a target "color". According to the principles of the present invention, color is defined to be a vector across all bands, such that the notion of conventional RGB (red, green, blue) color extends to multi-spectral images and multi-modal spatial arrays. The output from this system is a response map where the input image has pixel colors similar to the target color. The modalities of the bands of the multi-band images are not important to the method described herein, but may affect preprocessing steps.

FIG. 1 illustrates a flow diagram of the system for selective color processing for vision systems according to the principles of the present invention. As an optional step, preprocessing 100 of an input image (i.e., multi-band image 102) occurs to generate a multi-band transformed image 104. Target color isolation 106 of the multi-band transformed image 104 results in a distance map 108. With contrast enhancement 110, a response map 112 is generated and output 114. Each of these processes is described in detail below.

(2.2) Preprocessing

Preprocessing of the image (depicted as element 100 in FIG. 1) is optional and may involve one or more of the following: anti-aliasing, spatial resolution, down-sampling, noise-removal, color-space transformation into desired color space, or other standard image processing steps. A description of these image processing steps can be found in Digital Image Processing Using Matlab, 2$^{nd}$ Ed., Chapter 6, 2009 by Gonzalez, Woods and Eddins (hereinafter referred to as Gonzalez et al.), which is hereby incorporated by reference as though fully set forth herein. In terms of color-space transformation for conventional three-channel color images there are many options, such as RGB (red, green, blue), Yuv, and Lab to name a few, as described in Gonzalez et al. Through experimental studies, it was determined that it suffices to process three-channel images in RGB color space in many applications. However, other color spaces may potentially perform better, depending on the application. For general multi-band images, "color-space" transformation can be any linear or non-linear transformation that brings the original image into a form (another multi-band image with same or different number of channels as the original) that is more convenient for the subsequent processing. From this resulting multi-band image, the process now proceeds to isolating a target color and flattening the map to a single band.

Since the preprocessing step is optional, if the preprocessing step is employed, the input image (i.e., multi-band image, depicted as element 102 in FIG. 1) is referred to as the transformed image (i.e., multi-band transformed image, depicted as element 104. If the preprocessing step is not employed, the input image may be referred to as the original (untransformed) image, or multi-band image.

(2.3) Target Color Isolation

In order to reduce the dimensions and isolate the target color (depicted as element 106 in FIG. 1), a metric function is applied. A metric function is synonymous with a distance function, and the target color is a vector of color values in a multi-band image (depicted as element 102 in FIG. 1) that one wishes to enhance. The target color is always specified in the color space of the multi-band image as a result of the (optional) preprocessing step (element 100, FIG. 1), (i.e. the transformed image). In the present invention, the metric function gives a scalar distance in color space between each pixel color and the target color. This scalar value is zero if and only if the pixel color is the same as the target color, by definition of a metric function. The result is unbounded towards positive infinity in theory. However, in practice, the image domain is bounded, so the values of the resulting distance map by applying the metric function overall all pixels of the multi-band image will also be bounded. The distance map (depicted as element 108 in FIG. 1) represents the "closeness" to the target color of the pixel colors of the multi-band image, and is the input to the contrast enhancement step (depicted as element 110 in FIG. 1) described below. As can be appreciated by one skilled in the art, various metric functions can be used; however, it was determined that in practice the Euclidean distance works well.

The table below illustrates example metrics which could be used in conjunction with the present invention. The L1- and L2-norm induced metrics, also known respectively as the Manhattan and Euclidean distances, are standard methods for measuring distance. The infinity ($\infty$)-norm induced metric is used to measure the greatest deviation in any one dimension. The angular similarity metric is a measure of vector angle, as described by Schaefer and Wolff in Topological Vector Spaces, Macmillan Co., 1966, which is hereby incorporated by reference as though fully set forth herein. When applied to images in the RGB color space, it compares colors irrespective of the intensity (i.e., the magnitudes of the color components do not affect the angular similarity).

Table 1. Illustration of Example Metrics, where x and t are the pixel color and target color vectors, respectively, and $x_i$ and $t_i$ are their color components.

| Example metrics | |
| --- | --- |
| L1-norm induced metric | $\delta_{L1}(x, t) = \Sigma \ |x_i - t_i|$ |
| L2-norm induced metric | $\delta_{L2}(x, t) = \Sigma \ (x_i - t_i)^2$ |
| $\infty$-norm induced metric | $\delta_{\infty}(x, t) = \max \ |x_i - t_i|$ |
| Angular similarity metric | $\delta_{\theta}(x, t) = 1 - \left( \dfrac{2\cos^{-1}\left( \dfrac{\langle x, t \rangle}{\|x\|\|t\|} \right)}{\pi} \right)$ |

(2.4) Contrast Enhancement

Following target color isolation (depicted as element 106 in FIG. 1), a non-linear contrast enhancement procedure (depicted as element 110 in FIG. 1) is applied to normalize the distance map (depicted as element 108 in FIG. 1) to a fixed range and provide a larger portion of that range to values which correspond closely with the target color. The contrast enhancement procedure applies an exponential function to the intensity response map obtained in the previous step as follows:

$$f(I_{x,y};t) = e^{-\beta \delta(I_{x,y},t)},$$

where $I_{x,y}$ denotes the pixel color vector at pixel location (x, y), t denotes the target color vector, β(β>0) denotes a constant scaling factor (also referred to as a "sensitivity parameter"), and δ denotes the chosen metric function.

The exponential function has the effect of mapping zero to one and positive infinity to zero, which means pixel colors equal to the target color (for which the distance is zero according to the metric function δ) will now map to one and other pixel colors with larger distances to the target color will map closer to zero. The constant scaling factor β in the exponent determines the sensitivity of the output response map (depicted as element 112 in FIG. 1), compressing non-similar colors more than colors close to the target color. A higher constant scaling factor will penalize colors dissimilar from the target color more than a lower value would.

Since the function $f(I_{x,y}; t)$ is continuous and monotonic, there is no theoretical advantage to performing this step if the results are subsequently binarized (each pixel value is converted to 0 or 1) by thresholding, because one can achieve the same binary map directly from the distance map. However, it is a key step in the system because it increases the margin of error, building a higher tolerance into the final system. This tolerance can be crucial for applications which use the output directly without thresholding (such as in a saliency based object detection system).

(2.5) Implementation

Logically, the method according to the principles of the present invention is divided into three parts: pre-processing (depicted as element 100 in FIG. 1), target color isolation (depicted as element 102 in FIG. 1), and contrast enhancement (depicted as element 104 in FIG. 1). In practice, the last two steps (i.e., target color isolation and contrast enhancement) are performed simultaneously. Pre-processing aside, this yields a pixel-wise process which results in speedy performance and low memory requirements. For practical metrics, this method runs in O(Nd) where N is the number of pixels and d is the dimensionality of the data (the number bands) and consumes O(1) addition memory.

(2.6) Experimental Results

From experimental studies, it was determined that using the RGB color space and the Euclidean distance function sufficed on high resolution, low altitude aerial videos. In particular, this benefitted a saliency-based object detection system, which was responsive to bright white objects. Using video images processed with this method allows for the production of a saliency map which corresponds to objects of target colors, rather than only bright objects. By stretching the range of the map where target colors exist and suppressing other areas, the overall saliency of objects was increased as well.

Figure 2A:
FIG. 2A illustrates an original image prior to processing according to the principles of the present invention.
Figure 2B:
FIG. 2B illustrates the image from FIG. 2A processed with the selective color processing system with a $\beta$ value of 5 and black as the target color according to the principles of the present invention.
Figure 2C:
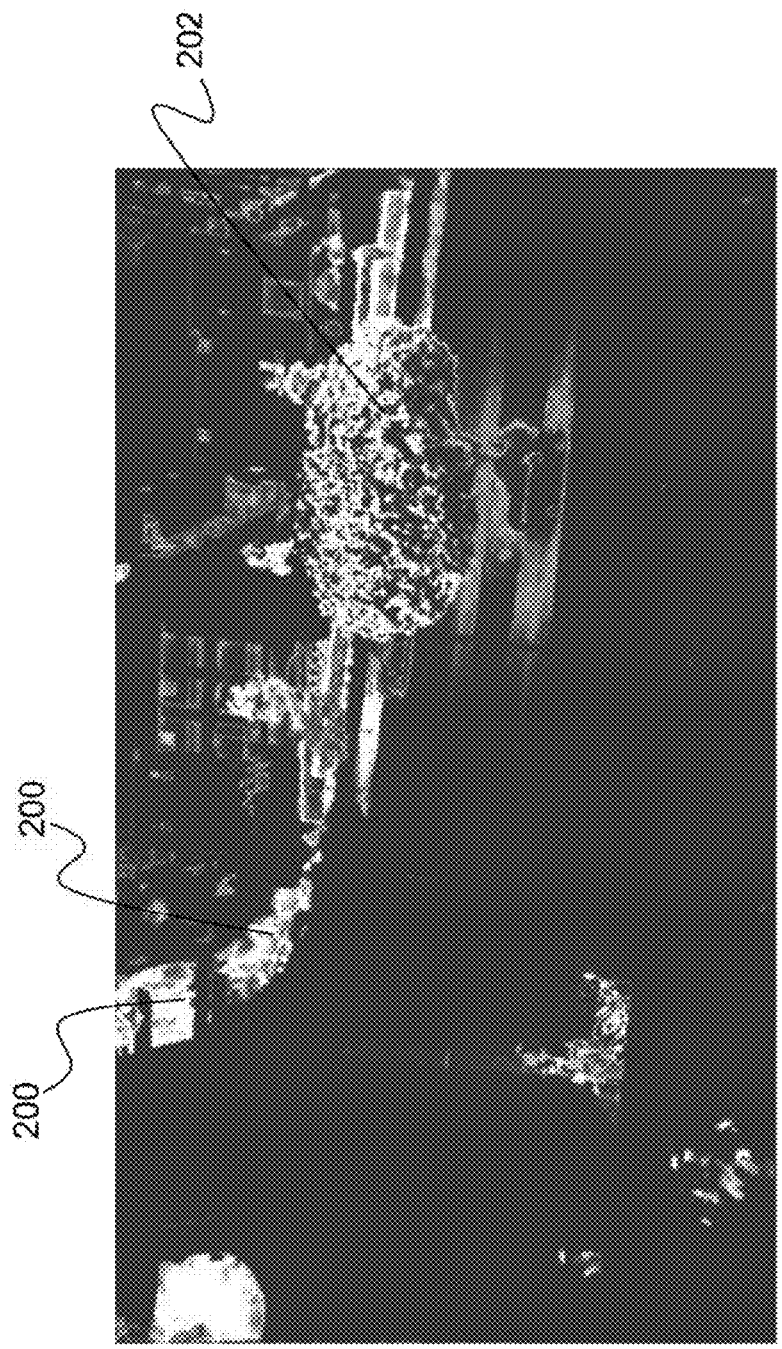
FIG. 2C illustrates the image from FIG. 2A processed with the selective color processing system with a $\beta$ value of 500 and green as the target color according to the principles of the present invention.
Figure 2D:
FIG. 2D illustrates the image from FIG. 2A processed with the selective color processing system with a $\beta$ value of 55 and black as the target color according to the principles of the present invention.

To test the method according to the principles of the present invention, low altitude aerial video sequences were used. FIGS. 2A-2D illustrate key results of the method described herein, including the ability to highlight and enhance the contrast of target colors (FIGS. 2C and 2D); and sensitivity to β parameters (FIGS. 2B and 2D). The β value determines how quickly the function output drops off. High values of β result in a larger range of output values for colors very close to the target color, while low values of β result in less such contrast enhancement. FIG. 2A is the original image prior to any processing. FIG. 2C is targeting green colors, while FIGS. 2B and 2D are targeting black colors. The β value for FIG. 2B is 5; the β value for FIG. 2C is 500, and the β value for FIG. 2D is 55. The grass 200 and trees 202 are correctly highlighted in FIG. 2C, while the black vehicle 204 is correctly highlighted in FIG. 2D. FIG. 2B is provided as a comparison for an incorrectly selected β value, since other colors besides black are highlighted.

As described above, one aspect of the experimental studies focused on looking for low contrast objects, such as a black vehicle 204 in the shade on a dark asphalt road, as shown in FIG. 2A. In applying the method, various metrics, scaling factors, and target colors were tested. Experimental results indicated the ability to enhance the black vehicle 204 against a low contrast black background, with success using the L2-norm induced metric (see Table 1), target color black [0,0,0] (i.e., the pixel value of all color components, red, green and blue, are zero), and various scaling factors, some better than others as revealed in the comparison of FIGS. 2B and 2D.

It was thought that perhaps black color=[0,0,0] was a special case, because it was bounded on three sides by the boundaries of the color space (in RGB color space, all color components are non-negative). Therefore, in another test, a choice was made to detect green color=[0.133,0.161,0.0902] (here each of the color components, red, green and blue, are represented on a scale spanning between 0.0 and 1.0), because the image contained grass patches and because green is not as close to the color space boundary. Results still indicated the ability to detect the correct grass regions, although with significantly higher sensitivity settings (FIG. 2C). In addition to correctly highlighting the grassy regions, the system according to the principles of the present invention was also able to suppress undesired colors. It was determined that inputting this into a saliency based object detection system gave improved performance.

Figure 3:
FIG. 3 illustrates an original image with a horizontal band from rows 660-710 indicated according to the principles of the present invention.
Figure 4:
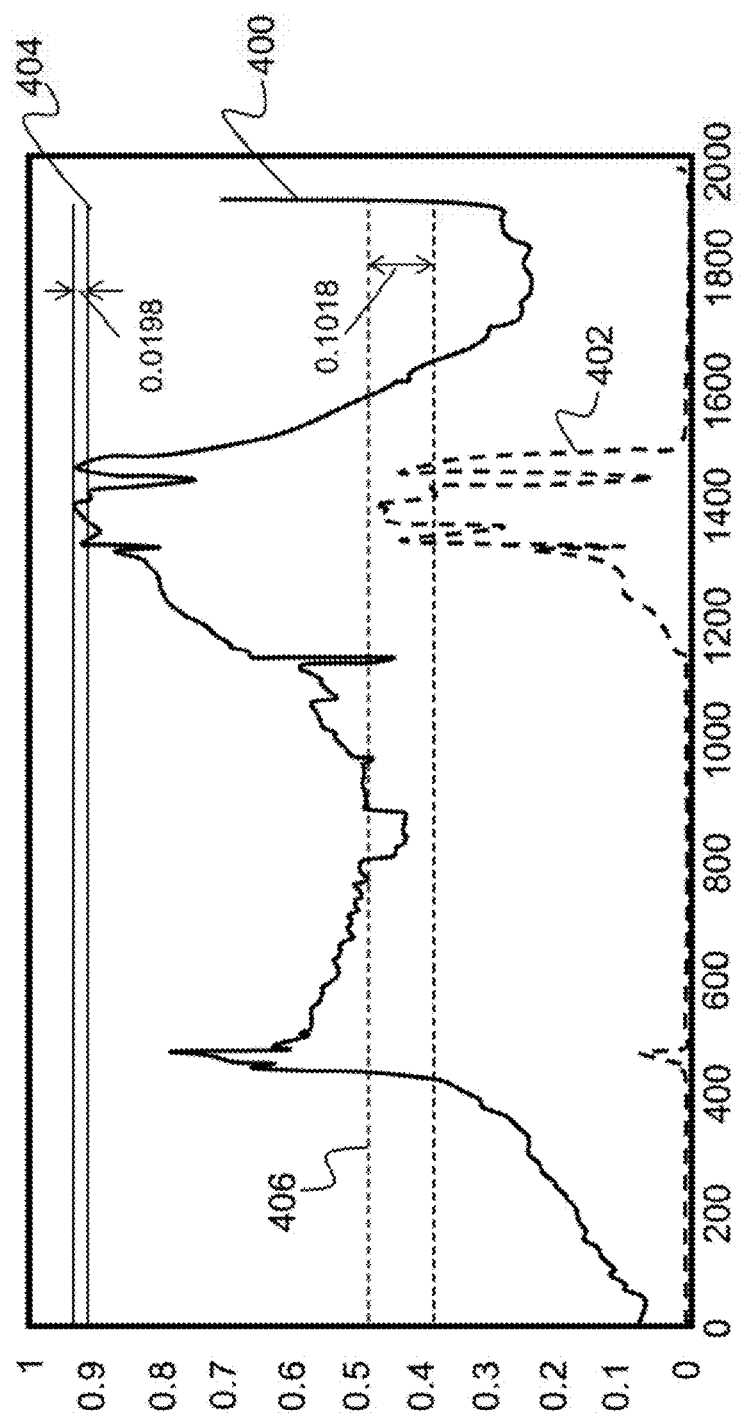
FIG. 4 illustrates a plot comparing intensities for row 690 of FIGS. 2B and 2D according to the principles of the present invention.

To further illustrate the localized range enhancement ability of the present invention, the response of a row from the image using two different values of β (5 and 55) was plotted. FIG. 3 is an original image with horizontal bands 300 from rows 660-710 indicated. FIG. 4 is a profile plot of intensities for row 690 (which is inside the bands indicated in FIG. 3) of FIGS. 2B and 2D using β=5 (solid line 400) and β=55 (dashed line 402), respectively. In both FIGS. 2B and 2D, the target colors are black, but β values are different. As a consequence, a higher β value stretches the output range for pixel colors near the target color more, and compresses pixel colors dissimilar to the target color more (FIG. 4, 402) than a lower β value (FIG. 4, 400). To show the extend of output range expansion, pairs of horizontal lines were also plotted in FIG. 4, indicating the output range after applying contrast enhancement for the same input image color range near the target color, where the solid horizontal lines 404 correspond to β=5, and the dashed horizontal lines 406 correspond to β=55. Note that when β=5, the difference is 0.0198, while when β=55, the difference is 0.1018. This demonstrates that higher contrast is achieved for higher β (i.e., β=55), while lower contrast is achieved for lower β (i.e., β=5).

Figure 5:
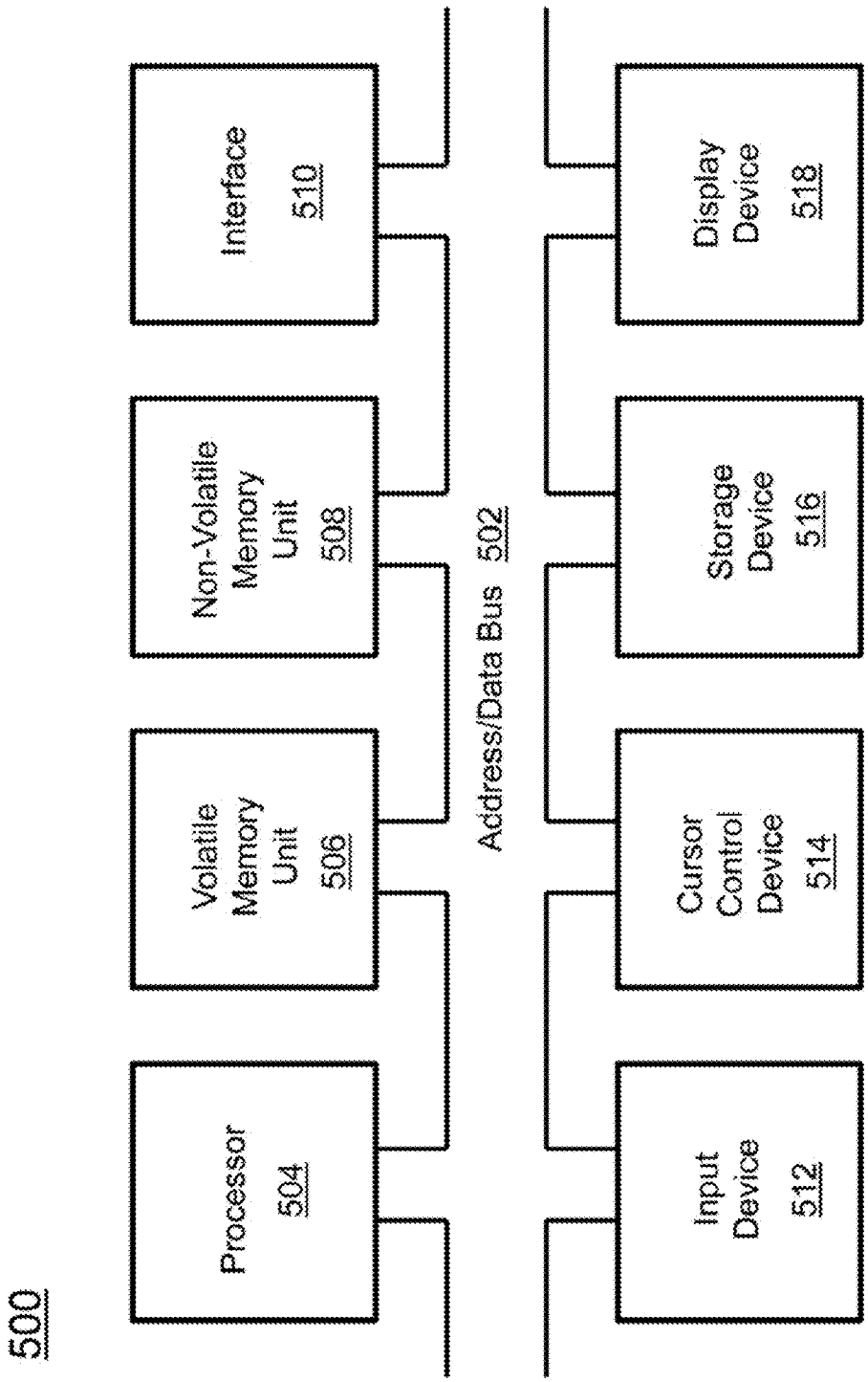
FIG. 5 is an illustration of a data processing system according to the principles of the present invention.

An example of a computer system 500 in accordance with one aspect is shown in FIG. 5. The computer system 500 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 500. When executed, the instructions cause the computer system 500 to perform specific actions and exhibit specific behavior, such as described herein.

The computer system 500 may include an address/data bus 502 that is configured to communicate information. Additionally, one or more data processing units, such as a processor 504, are coupled with the address/data bus 502. The processor 504 is configured to process information and instructions. In one aspect, the processor 504 is a microprocessor. Alternatively, the processor 504 may be a different type of processor such as a parallel processor, or a field programmable gate array.

The computer system 500 is configured to utilize one or more data storage units. The computer system 500 may include a volatile memory unit 506 (e.g., random access memory ("RAM"), static RAM, dynamic RAM, etc.) coupled with the address/data bus 502, wherein a volatile memory unit 506 is configured to store information and instructions for the processor 504. The computer system 500 further may include a non-volatile memory unit 508 (e.g., read-only memory ("ROM"), programmable ROM ("PROM"), erasable programmable ROM ("EPROM"), electrically erasable programmable ROM "EEPROM"), flash memory, etc.) coupled with the address/data bus 502, wherein the non-volatile memory unit 508 is configured to store static information and instructions for the processor 504. Alternatively, the computer system 500 may execute instructions retrieved from an online data storage unit such as in "Cloud" computing. In an embodiment, the computer system 500 also may include one or more interfaces, such as an interface 510, coupled with the address/data bus 502. The one or more interfaces are configured to enable the computer system 500 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 500 may include an input device 512 coupled with the address/data bus 502, wherein the input device 512 is configured to communicate information and command selections to the processor 500. In accordance with one aspect, the input device 512 is an alphanumeric input device, such as a keyboard, that may include alphanumeric and/or function keys. Alternatively, the input device 512 may be an input device other than an alphanumeric input device. In one aspect, the computer system 500 may include a cursor control device 514 coupled with the address/data bus 502, wherein the cursor control device 514 is configured to communicate user input information and/or command selections to the processor 500. In one aspect, the cursor control device 514 is implemented using β device such as a mouse, a track-ball, a track-pad, an optical tracking device, or a touch screen. The foregoing notwithstanding, in one aspect, the cursor control device 514 is directed and/or activated via input from the input device 512, such as in response to the use of special keys and key sequence commands associated with the input device 512. In an alternative aspect, the cursor control device 514 is configured to be directed or guided by voice commands.

In one aspect, the computer system 500 further may include one or more optional computer usable data storage devices, such as a storage device 516, coupled with the address/data bus 502. The storage device 516 is configured to store information and/or computer executable instructions. In one aspect, the storage device 516 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 518 is coupled with the address/data bus 502, wherein the display device 518 is configured to display video and/or graphics. In one aspect, the display device 518 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 500 presented herein is an example computing environment in accordance with one aspect. However, the non-limiting example of the computer system 500 is not strictly limited to being a computer system. For example, one aspect provides that the computer system 500 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 6:
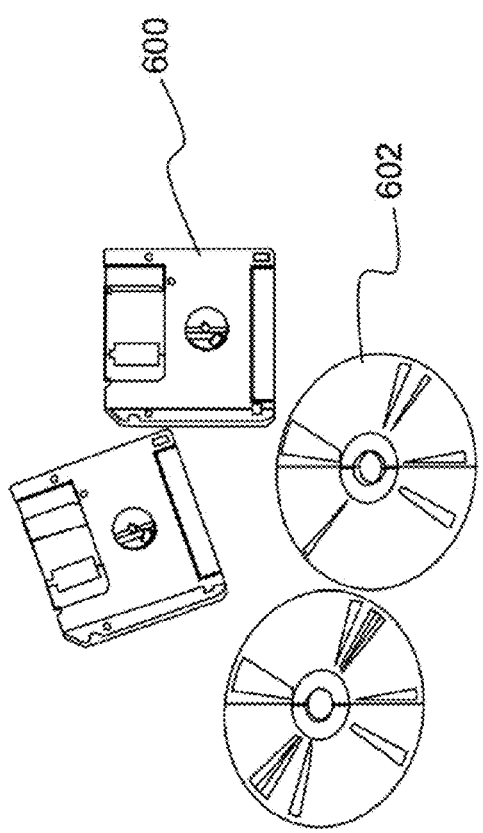
FIG. 6 is an illustration of a computer program product according to the principles of the present invention.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents computer readable code (i.e., instruction means or instructions) stored on any compatible non-transitory computer readable medium.

What is claimed is:

1. A system for selective color processing, the system comprising:
one or more processors and a non-transitory computer-readable medium having executable instructions encoded thereon such that when executed, the one or more processors perform operations of:
receiving a multi-band image as input;
applying a metric function to the multi-band image to generate a distance map, wherein the distance map comprises a plurality of intensities which vary based on a similarity between an intensity of a pixel color and an intensity of a target color of interest;
applying a contrast enhancement process to the distance map to normalize the distance map to a range of values;
expanding the range of values of the distance map near the intensity of the target color of interest; and
generating an output response map for the target color of interest having value ranges to aid in detection and recognition processes, wherein the output response map comprises a plurality of regions, and wherein the output response map has high responses in regions which contain colors similar to the target color of interest in the multi-band image.

2. The system as set forth in claim 1, wherein the one or more processors further perform an operation of outputting a scalar distance in the color space between each pixel color in the multi-band image and the target color of interest.

3. The system as set forth in claim 2, wherein the one or more processors further perform an operation of expanding the range of values via a tunable sensitivity parameter.

4. The system as set forth in claim 3, wherein the one or more processors further perform an operation of applying an exponential function to the distance map, such that the intensity of the target color of interest in the multi-band image maps to one, and pixel colors with a larger distance to the target color of interest map closer to zero.

5. The system as set forth in claim 4, wherein the one or more processors further perform an operation of compressing the value ranges of the output response map for regions of the multi-band image with pixel colors that are non-similar to the target color of interest and expanding the value ranges of the output response map for pixel colors that are similar to the target color of interest.

6. The system as set forth in claim 1, wherein, prior to applying the metric function, the one or more processors further perform an operation of preprocessing the multi-band image and performing a transformation to transform the multi-band image into a preferred color space, resulting in a transformed image having pixel colors, wherein the output response map has high responses in regions which contain colors similar to the target color of interest in the transformed image.

7. The system as set forth in claim 6, wherein the one or more processors further perform an operation of applying an exponential function to the distance map, such that the intensity of the target color of interest in the transformed image maps to one, and pixel colors with a larger distance to the target color of interest map closer to zero.

8. The system as set forth in claim 7, wherein the one or more processors further perform an operation of compressing the value ranges of the output response map for regions of the transformed image with pixel colors that are non-similar to the target color of interest and expanding the value ranges of the output response map for pixel colors that are similar to the target color of interest.

9. A computer-implemented method for selective color processing, comprising an act of:
  causing one or more processors to execute instructions stored on a non-transitory memory such that upon execution, the one or more processors performs operations of:
  receiving a multi-band image as input;
  applying a metric function to the multi-band image to generate a distance map, wherein the distance map comprises a plurality of intensities which vary based on a similarity between an intensity of a pixel color and an intensity of a target color of interest;
  applying a contrast enhancement process to the distance map to normalize the distance map to a range of values;
  expanding the range of values of the distance map near the intensity of the target color of interest; and
  generating an output response map for the target color of interest having value ranges to aid in detection and recognition processes, wherein the output response map comprises a plurality of regions, and wherein the output response map has high responses in regions which contain colors similar to the target color of interest in the multi-band image.

10. The method as set forth in claim 9, wherein the data processor further performs an operation of outputting a scalar distance in the color space between each pixel color in the multi-band image and the target color of interest.

11. The method as set forth in claim 10, wherein the data processor further performs an operation of expanding the range of values via a tunable sensitivity parameter.

12. The method as set forth in claim 11, wherein the data processor further performs an operation of applying an exponential function to the distance map, such that the intensity of the target color of interest in the multi-band image maps to one, and pixel colors with a larger distance to the target color of interest map closer to zero.

13. The method as set forth in claim 12, wherein the data processor further performs an operation of compressing the value ranges of the output response map for regions of the multi-band image with pixel colors that are non-similar to the target color of interest and expanding the value ranges of the output response map for pixel colors that are similar to the target color of interest.

14. The method as set forth in claim 9, wherein the data processor further performs an operation of preprocessing the multi-band image and performing a transformation to transform the multi-band image into a preferred color space, resulting in a transformed image having pixel colors, wherein the output response map has high responses in regions which contain colors similar to the target color of interest in the transformed image.

15. The method as set forth in claim 14, wherein the data processor further performs an operation of applying an exponential function to the distance map, such that the intensity of the target color of interest in the transformed image maps to one, and pixel colors with a larger distance to the target color of interest map closer to zero.

16. The method as set forth in claim 15, wherein the data processor further performs an operation of compressing the value ranges of the output response map for regions of the transformed image with pixel colors that are non-similar to the target color of interest and expanding the value ranges of the output response map for pixel colors that are similar to the target color of interest.

17. A computer program product for selective color processing, the computer program product comprising computer-readable instructions stored on a non-transitory computer-readable medium that are executable by a computer having a processor for causing the processor to perform operations of:
  receiving a multi-band image as input;
  applying a metric function to the multi-band image to generate a distance map, wherein the distance map comprises a plurality of intensities which vary based on a similarity between an intensity of a pixel color and an intensity of a target color of interest;
  applying a contrast enhancement process to the distance map to normalize the distance map to a range of values;
  expanding the range of values of the distance map near the intensity of the target color of interest; and
  generating an output response map for the target color of interest having value ranges to aid in detection and recognition processes, wherein the output response map comprises a plurality of regions, and wherein the output response map has high responses in regions which contain colors similar to the target color of interest in the multi-band image.

18. The computer program product as set forth in claim 17, further comprising instructions for causing the processor to perform an operation of outputting a scalar distance in the color space between each pixel color in the multi-band image and the target color of interest.

19. The computer program product as set forth in claim 18, further comprising instructions for causing the processor to perform an operation of expanding the range of values via a tunable sensitivity parameter.

20. The computer program product as set forth in claim 19, further comprising instructions for causing the processor to perform an operation of applying an exponential function to the distance map, such that the intensity of the target color of interest in the multi-band image maps to one, and pixel colors with a larger distance to the target color of interest map closer to zero.

21. The computer program product as set forth in claim 20, further comprising instructions for causing the processor to perform an operation of compressing the value ranges of the output response map for regions of the multi-band image with pixel colors that are non-similar to the target color of interest and expanding the value ranges of the output response map for pixel colors that are similar to the target color of interest.

22. The computer program product as set forth in claim 17, further comprising instructions for causing the processor to perform an operation of preprocessing the multi-band image and performing a transformation to transform the multi-band image into a preferred color space, resulting in a transformed image having pixel colors, wherein the output response map has high responses in regions which contain colors similar to the target color of interest in the transformed image.

23. The computer program product as set forth in claim 22, further comprising instructions for causing the processor to perform an operation of applying an exponential function to the distance map, such that the intensity of the target color of interest in the transformed image maps to one, and pixel colors with a larger distance to the target color of interest map closer to zero.

24. The computer program product as set forth in claim 23, further comprising instructions for causing the processor to perform an operation of compressing the value ranges of the output response map for regions of the transformed image with pixel colors that are non-similar to the target color of interest and expanding the value ranges of the output response map for pixel colors that are similar to the target color of interest.

\* \* \* \* \*